United States Patent [19]

Jäger

[11] Patent Number: 5,116,957
[45] Date of Patent: May 26, 1992

[54] REACTIVE AZO DYESTUFFS HAVING A FLUOROTRIAZINE GROUP AND IMPROVED FIXATION PROPERTIES

[75] Inventor: Horst Jäger, Leverkusen, Fed. Rep. of Germany

[73] Assignee: Bayer Aktiengesellschaft, Leverkusen, Fed. Rep. of Germany

[21] Appl. No.: 603,595

[22] Filed: Oct. 25, 1990

Related U.S. Application Data

[63] Continuation-in-part of Ser. No. 63,186, Jun. 17, 1987, abandoned, which is a continuation of Ser. No. 311,097, Oct. 13, 1981, abandoned, which is a continuation of Ser. No. 155,801, Jun. 2, 1980, abandoned, which is a continuation of Ser. No. 43,251, May 29, 1979, abandoned.

[30] Foreign Application Priority Data

Jul. 6, 1978 [DE] Fed. Rep. of Germany ....... 2829711

[51] Int. Cl.⁵ .................. C09B 62/08; D06P 1/382
[52] U.S. Cl. .................... 534/632; 534/636; 534/638
[58] Field of Search ................. 534/632, 638

[56] References Cited

U.S. PATENT DOCUMENTS

| 3,627,749 | 12/1971 | Ackermann et al. | 534/638 X |
| 4,115,378 | 9/1978 | Bien et al. | 534/638 X |
| 4,126,609 | 11/1978 | Jager, I | 534/638 X |

FOREIGN PATENT DOCUMENTS

| 2349709 | 4/1974 | Fed. Rep. of Germany | 534/638 |
| 2318412 | 10/1974 | Fed. Rep. of Germany | 534/638 |

OTHER PUBLICATIONS

Harms, Organofluorine Chemicals and Their Industrial Applications, Ed. R. E. Banks, Horwood Chichester, pp. 188-207 (1979).

Sumner et al., *Melliand Textilberichte*, 42, pp. 1161-1166 (1961).

Ciba-Geigy 3160 Cibacron Dyes in the Exhaustion Method, pp. 1-22 (1974).

*Primary Examiner*—Patricia L. Morris
*Assistant Examiner*—Fiona T. Powers
*Attorney, Agent, or Firm*—Sprung Horn Kramer & Woods

[57] ABSTRACT

Reactive azo dyestuffs of the formula

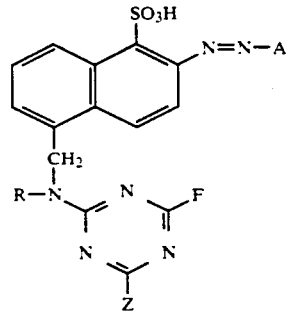

wherein R, Z and A have the meaning indicated in the description, and their use for dyeing and printing materials containing hydroxyl groups or amide groups, such as textile fibers, filaments and fabrics of wool, silk and synthetic polyamide fibers and polyurethane fibers, and for dyeing and printing natural or regenerated cellulose in shades which are fast to washing.

1 Claim, No Drawings

REACTIVE AZO DYESTUFFS HAVING A FLUOROTRIAZINE GROUP AND IMPROVED FIXATION PROPERTIES

This is a continuation-in-part of application Ser. No. 07/063,186, filed Jun. 17, 1987, now abandoned, which is a continuation of application Ser. No. 311,097 filed Oct. 13, 1981, now abandoned, which is a continuation of application Ser. No. 155,801 filed Jun. 2, 1980, now abandoned, which is a continuation of application Ser. No. 43,251, filed May 29, 1979, now abandoned.

The present invention relates to new reactive azo dyestuffs which, in the acid form, correspond to the formula

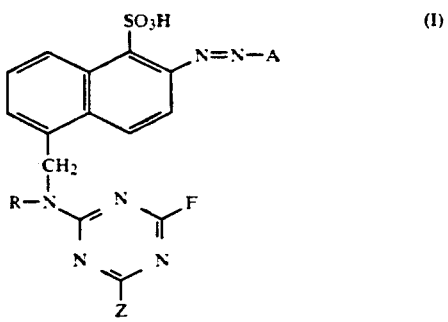

wherein
R represents $C_1$-$C_4$-alkyl and hydrogen,
Z represents an optionally substituted amino group, an optionally etherified hydroxyl group, an optionally etherified thiol group, an optionally substituted hydrocarbon radical or fluorine and
A denotes the radical of a coupling component.

Examples of suitable radicals Z are amino, mono-$C_1$-$C_4$-alkylamino and di-$C_1$-$C_4$-alkylamino, it being possible for the alkyl group to be optionally substituted, for example by OH, sulpho or $OSO_3H$, or phenylamino which is optionally substituted by $C_1$-$C_4$-alkyl, sulpho, $C_1$-$C_4$-alkoxy, carboxyl or halogen, in particular chlorine, and the corresponding N-$C_1$-$C_4$-alkyl-N-phenylamino groups; phenyl-$C_1$-$C_4$-alkylamino, it being possible for the phenyl radical to be substituted as indicated above; and the corresponding N-$C_1$-$C_4$-alkyl-N-phenyl-$C_1$-$C_4$-alkylamino radicals, naphthylamino which is optionally substituted by sulpho, $C_1$-$C_4$-alkoxy which is optionally substituted by hydroxyl, phenoxy which is optionally by $C_1$-$C_4$-alkyl, sulpho, $C_1$-$C_4$-alkylthio which is optionally substituted by OH, or phenylthio.

Examples of substituents Z on the triazine ring are the following: the amino, methylamino, ethylamino, β-hydroxyethylamino, dimethylamino, morpholino, piperidino, N-(o-, m- or p-sulphophenyl)-amino, N-(o-, m- or p-methylphenyl)-amino, N-(o-, m- or p-methoxyphenyl)-amino, N-(o-, m- or p-chlorophenyl)-amino, N-(2,4- or 2,5-disulphophenyl)-amino, N-(2-sulpho-4-methoxyphenyl)-amino, N-(2-sulpho-4-methylphenyl)-amino, N-(2-sulpho-4-chlorophenyl)-amino, N-(2-carboxy-4- or 5-sulphophenyl)-amino, N-(2-carboxyphenyl)-amino, N-(4-sulphomethylphenyl)-amino, N-methylamino-benzyl, N-methylaminobenzyl-3-sulphonic acid, N-(4- or 5- or 6- or 7- or 8-sulphonaphth-1-yl)-amino, N-(5-or 6- or 7- or 8-sulphonaphth-2-yl)-amino and N-(4,8-disulphonaphth-2-yl)-amino group; the methoxy, ethoxy, β-hydroxyethoxy, phenoxy, methylphenoxy, phenylthio and 2-mercapto-benzthiazole group and amino groups with dyestuff character, such as, for example, dyestuff radicals, containing amino groups, of the monoazo or polyazo, phthalocyanine, formazan, anthraquinone, stilbene, oxazine, dioxazine, triphenylmethane, nitro or azomethine series. The radical Z can also contain further reactive groups.

Examples of suitable radicals A are those of coupling components of the hydroxybenzene, aminobenzene, aminonaphthalene, hydroxynaphthalene, aminohydroxynaphthalene, pyrazolone, aminopyrazole, acetoacetic acid arylamide and aminopyrimidine series. The radicals A can contain substituents customary for azo dyestuffs, for example sulphonic acid, carboxylic acid, optionally substituted sulphonamide, sulphone, alkylamino, aralkylamino, arylamino, acylamino, nitro, cyano, hydroxyl, alkoxy and azo groups, halogen atoms, such as fluorine, chlorine and bromine, and the like.

Preferred compounds within the scope of the new dyestuffs correspond to the following formulae:

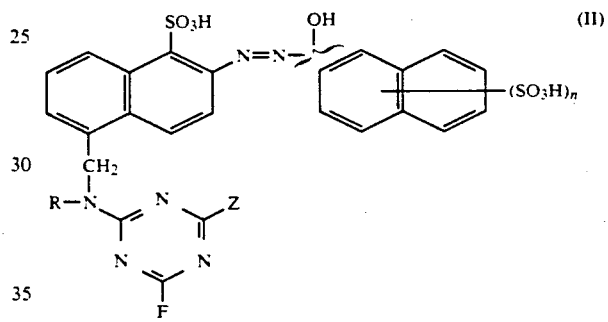

wherein
R and Z have the meaning indicated and
n represents 1, 2 or 3;

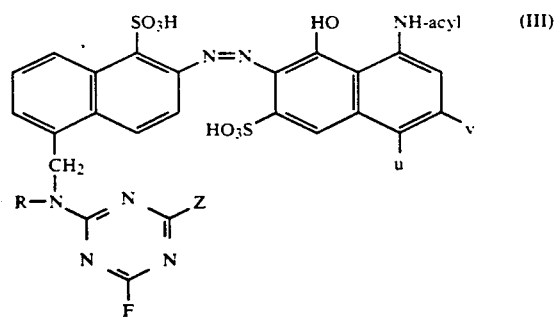

wherein
R and Z have the meaning indicated,
-u and v represent hydrogen or a sulphonic acid group, and u≠v, and
acyl represents an acyl group, for example an alkylcarbonyl, alkylsulphonyl, arylcarbonyl or arylsulphonyl group.

Preferred alkyl groups are those with 1–4 C atoms and preferred aryl groups are optionally substituted phenyl groups, for example phenyl groups which are optionally substituted by Cl, $C_1$-$C_4$-alkyl or $C_1$-$C_4$-alkoxy. Further preferred dyestuffs are those of the formula

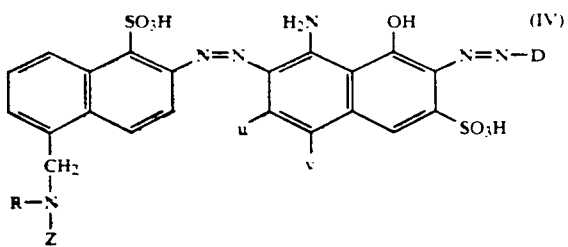

(IV)

wherein
R, Z, u and v have the meaning indicated above and
D represents the radical of a diazo component of the benzene or naphthalene series, and those of the formula

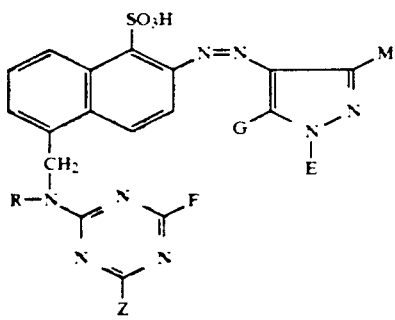

(V)

wherein
R and Z have the meaning indicated above,
E represents an alkyl, phenyl or naphthyl radical which is substituted by at least one group which confers water-solubility, in particular a sulphonic acid group,
M represents a methyl, carboxyl or carboxamide group and
G represents an OH or NH$_2$ group.
Compounds of the formula I-V wherein
Z represents the radical of an optionally substituted amino group, and compounds of the formula I-V wherein
Z = amino, mono-C$_1$-C$_4$-alkylamino, di-C$_1$-C$_4$-alkylamino or phenylamino which is optionally substituted by C$_1$-C$_4$-alkyl, sulpho, carboxyl, halogen or C$_1$-C$_4$-alkoxy are also preferred.

The invention furthermore relates to processes for the preparation of the compounds of the formula 1. The following variants may be mentioned specifically:

1) The dyestuff of the formula

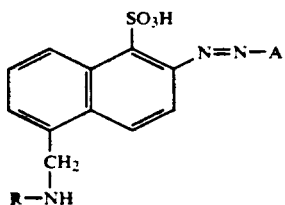

(VI)

wherein
R and A have the meaning indicated above, is with a) reacted with 2,4,6-trifluoro-1,3,5-triazine, HF being split off, and the product is then reacted with H-Z, HF being split off, or b) reacted with condensation products of the formula

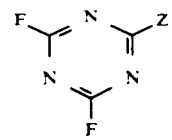

(VII)

wherein
Z has the meaning indicated above, HG being split off.

The reaction of VII with 2,4,6-trifluoro-1,3,5-triazine or its monocondensation product of the formula

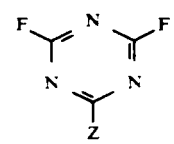

(VII)

is in general carried out in an aqueous solution or suspension at neutral or weakly alkaline pH values, the hydrogen fluoride liberated during the reaction advantageously being continuously neutralised by adding aqueous alkali metal hydroxide solutions, alkali metal carbonates or alkali metal bicarbonates.

2) The condensation product of the formula

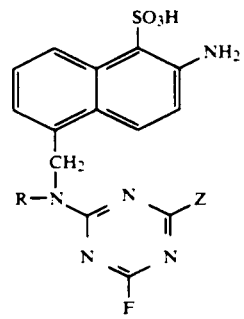

(VIII)

wherein
Z and R have the meaning indicated above, is diazotised and the diazotisation product is reacted with a coupling component of the formula H-A wherein
A has the meaning indicated above, to give I.

The coupling is carried out in an aqueous medium, the acid originating from the diazotisation and the acid liberated during the reaction being removed by adding bases.

The most favourable process is varient (Ib).

Examples of compounds of the formula

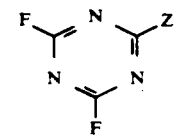

(VII)

wherein Z has the meaning indicated above are, for example: 2,4-difluoro-6-amino-1,3,5-triazine, 2,4-difluoro-6-phenylamino-1,3,5-triazine, 2,4-difluoro-6-(4'-sulphophenyl)-amino-1,3,5-triazine, 2,4-difluoro-6-(3'-sulphophenyl)-amino-1,3,5-triazine, 2,4-difluoro-6-

(2'-sulphophenyl)-amino-1,3,5-triazine, 2,4-difluoro-6-(2'-methylphenyl)-amino-1,3,5-triazine, 2,4-difluoro-6-(2'-methoxyphenyl)-amino-1,3,5-triazine, 2,4-difluoro-6-(2'-chlorophenyl)-amino-1,3,5-triazine, 2,4-difluoro-6-(4'-methylphenyl)-amino-1,3,5-triazine, 2,4-difluoro-6-(N-methyl-benzyl)-amino-1,3,5-triazine, 2,4-difluoro-6-(N-methyl-phenyl)-amino-1,3,5-triazine, 2,4-difluoro-6-(4'-sulpho-naphth-1'-yl)-amino-1,3,5-triazine, 2,4-difluoro-6-(6'-sulpho-naphth-2'-yl)-amino-1,3,5-triazine, 2,4-difluoro-6-(4'-sulphomethylphenyl)-amino-1,3,5-triazine, 2,4-difluoro-6-(2'-carboxy-phenyl)-amino-1,3,5-triazine, 2,4-difluoro-6-piperidino-1,3,5-triazine, 2,4-difluoro-6-morpholino-1,3,5-triazine, 2,4,6-trifluoro-1,3,5-triazine, 2,4-difluoro-6-methylamino-1,3,5-triazine, 2,4-difluoro-6-β-hydroxyethylamino-1,3,5-triazine, 2,4-difluoro-6-dimethylamino-1,3,5-triazine, 2,4-difluoro-6-methoxy-1,3,5-triazine and 2,4-difluoro-6-phenoxy-1,3,5-triazine, and intermediate products with dyestuff character, such as, for example, reaction products of dyestuffs of the monoazo or polyazo, phthalocyanine, formazan, anthraquinone, stilbene, oxazine, dioxazine, triphenylmethane, nitro or azomethine series with 2,4,6-trifluoro-1,3,5-triazine.

Examples of suitable compounds of the formula H-Z are: methanol, ethanol, phenol, thiophenol, ammonia, ethylamine, dimethylamine, diethylamine, ethanolamine, diethanolamine, morpholine, piperidine, 2,3- or 4-aminotoluene, 2,3- or 4-aminoanisole, 2,3- or 4-chloroaniline, 2,3-or 4-sulphoaniline, aniline, N-methylaniline, 4-aminobenzylsulphonic acid, 2,3- or 4-aminobenzoic acid, N-methylbenzylamine, N-methylbenzylamine-3- or -4-sulphonic acid, naphthylaminemono-, di- and tri-sulphonic acids and dyestuffs, containing amino groups, of the monoazo or polyazol, phthalocyanine, formazan, anthraquinone, stilbene, oxazine, dioxazine, triphenylmethane, nitro or azomethine series.

The dyestuffs of the general formula (VI) used as a starting material for process 1a and b can be prepared by a process in which diazotised amines of the formula

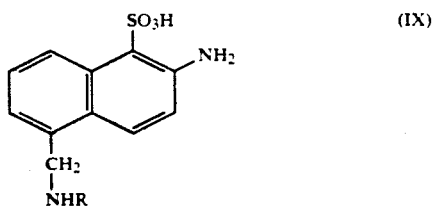

(IX)

wherein
R has the meaning indicated, are coupled with azo components A-H (X) in a medium which has been rendered acid with mineral acid or acetic acid, a neutral medium or a medium which has been rendered alkaline with bicarbonate, sodium carbonate or sodium carbonate.

Examples of suitable azo components (X) are those of the aminobenzene, aminonaphthalene, hydroxynaphthalene, amino-hydroxy-naphthalene, acylamino-hydroxy-naphthalene, arylamino-hydroxy-naphthalene, pyrazolone, aminopyrazole and acetoacetic acid amide series. Amongst the large number of azo components to be mentioned here, the following may be mentioned as examples: 1-amino-2-sulpho-5-acetylamino-benzene, 2-amino-5,6- or 7-sulpho-naphthalene, 2-amino-5,7-disulpho-naphthalene, 2-amino-3,6-disulpho-naphthalene, 1-amino-6-or 7-sulpho-naphthalene, 1-amino-3-acetylamino-benzene, 1-amino-3-ureido-benzene, 1-amino-3-methyl-benzene, 1-amino-3-methyl-6-methoxy-benzene, 1-amino-2,5-dimethoxy-benzene, 1-hydroxy-5-sulpho-naphthalene, 1-hydroxy-3,6-disulpho-naphthalene, 1-hydroxy-3,7-disulpho-naphthalene, 1-hydroxy-3,8-disulpho-naphthalene, 1-hydroxy-4,6-disulphonaphthalene, 1-hydroxy-4,7-disulpho-naphthalene, 1-hydroxy-4,8-disulpho-naphthalene, 1-hydroxy-3,5-disulpho-naphthalene, 1-hydroxy-8-benzoyl-amino-3,6-disulpho-naphthalene, 1-hydroxy-8-benzoyl-amino-3,5-disulpho-naphthalene, 1-hydroxy-8-ureido-3,6-disulpho-naphthalene, 1-hydroxy-8-ureido-3,5-disulpho-naphthalene, 1-hydroxy-8-acetylamino-3,5-disulpho-naphthalene, 1-hydroxy-8-acetylamino-3,6-disulpho-naphthalene, 1-hydroxy-7-amino-3-sulpho-naphthalene, 1-hydroxy-7-phenylamino-3-sulpho-naphthalene, 1-hydroxy-8-amino-3,6-disulpho-naphthalene, 1-hydroxy-8-amino-3,5-disulfpho-naphthalene, 1-hydroxy-7-amino-3,6-disulpho-naphthalene, 1-hydroxy-6-amino-3-sulpho-naphthalene, 1-hydroxy-6-amino-amino-3,5-disulpho-naphthalene, 4-sulpho-benzene-<1 azo 7>-8-amino-1-hydroxy-3,6-disulpho-naphthalene, 3-sulpho-benzene-<1 azo 7>-8-amino-1-hydroxy-3,5-disulpho-naphthalene, 4-nitro-2-sulpho-benzene-<1 azo 7>-8-amino-1-hydroxy-3,6-disulpho-naphthalene, 1-(2',3'- or 4'-sulpho-phenyl)-3-methyl-pyrazol-5-one, 1-(2'-chloro-4' or 5'-sulpho-phenyl)-3-methyl-pyrazol-5-one, 1-(2'-methyl-4'-sulpho-phenyl)-3-methyl-pyrazol-5-one, 1-(2'-methyl-4'-sulpho-phenyl)-3-carboxy-pyrazol-5-one, 1-β-carboxy-ethyl-3-carboxy-pyrazol-5-one, 1-(4',8'-disulpho-naphth-2-yl)-3-methyl-pyrazol-5-one, 1-(5',7'-disulpho-naphth-2-yl)-3-methyl-pyrazol-5-one, 1-(2'-chloro-5'-sulpho-phenyl)-3-methyl-5-amino-pyrazole, 1-(2'-chloro-4'-sulpho-phenyl)-3-methyl-5-amino-pyrazole, 1-(3' or 4'-sulpho-phenyl)-3-methyl-5-amino-pyrazole, 1-carboxymethyl-3-methyl-pyrazol-5-one, 1-β-carboxyethyl-3-methyl-pyrazol-5-one, 1-β-carboxyethyl-3-methyl-5-amino-pyrazole and 1-(4'-sulpho-phenyl)-3-carboxy-pyrazol-5-one.

If the monoazo dyestuffs obtainable using the azo components mentioned still contain diazotisable amino groups, these can also be diazotised by a customary process and the diazotisation product reacted again with a suitable coupling component, disazo dyestuffs being obtained.

The coupling component used for renewed reaction with the diazotised monoazo dyestuff can be, for example, a compound from the series of azo components (X) already indicated.

A further possibility of building up disazo dyestuffs of the type mentioned is to prepare monoazo dyestuffs which still contain positions which are capable of coupling and then to combine these dyestuffs with suitable diazo components in a second coupling step, it being possible to employ the diazo component IX, to be used according to the invention, for the first or second coupling step. As azo components which serve to build up monoazo dyestuffs of this type there may be used, above all, those of the dihydroxy-benzene, dihydroxy-naphthalene and aminohydroxynaphthalene series. In addition to the components already mentioned, 1,3-dihydroxybenzene and 1,3-dihydroxynaphthalene-5,7-disulphonic acid may also be mentioned as examples.

Diazo components which can be used for building up diazo dyestuffs of this type are, inter alia: 1-amino-4-sulpho-benzene, 1-amino-3-sulpho-benzene, 1-amino-2- chloro-5-sulpho-benzene, 1-amino-2-sulpho-4-nitro-benzene, 1-amino-2,5-disulphobenzene, 1-amino-4-nitro-benzene, 1-amino-4-methyl-sulphonyl-benzene, 2-amino-4,8-disulpho-naphthalene and 2-amino-6,8-disulpho-naphthalene.

The formulae indicated for the dyestuffs are those of the corresponding free acids. In general, the dyestuffs were isolated and employed for dyeing in the form of the alkali metal salts, in particular the Na salts.

The new dyestuffs have improved fixation properties and are suitable for dyeing and printing materials containing hydroxyl groups or amide groups, such as textile fibres-, filaments and fabrics of wool, silk and synthetic polyamide fibres and polyurethane fibres, and for dyeing and printing natural or regenerated cellulose in shades which are fast to washing, the treatment of cellulose materials appropriately being carried out in the presence of acid-binding agents and if appropriate by the action of heat, in accordance with the processes disclosed for reactive dyestuffs.

EXAMPLE 1

17.3 g of m-sulphanilic acid are dissolved in 0.8 liter of ice-water under neutral conditions. 13.5 g of 2,4,6-trifluoro-1,3,5-triazine are then added dropwise and a pH value of 2.5–3 is thereby maintained by adding dilute sodium hydroxide solution. After adding the trifluorotriazine, the mixture is subsequently stirred for a further few minutes and a solution of 69 g of the dyestuff of the formula

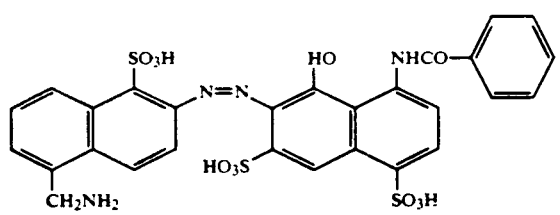

(prepared by diazotising 2-amino-1-sulpho-5-aminomethyl-naphthalene and coupling the diazotisation product to 1-hydroxy-8-benzoylamino-naphthalene-3,5-disulphonic acid in a neutral medium) in a mixture of 500 ml of water and 7 ml of concentrated sodium hydroxide solution is then added dropwise. The pH is simultaneously adjusted to 8.5–9 by adding dilute sodium hydroxide solution. The temperature is kept at 0°–5° C. by adding ice. When the condensation reaction has ended, the dyestuff is salted out by adding sodium chloride and is filtered off dried and ground. A red powder is obtained which dissolves in water giving a bluish-tinged red-coloured solution. The dyestuff corresponds to the formula

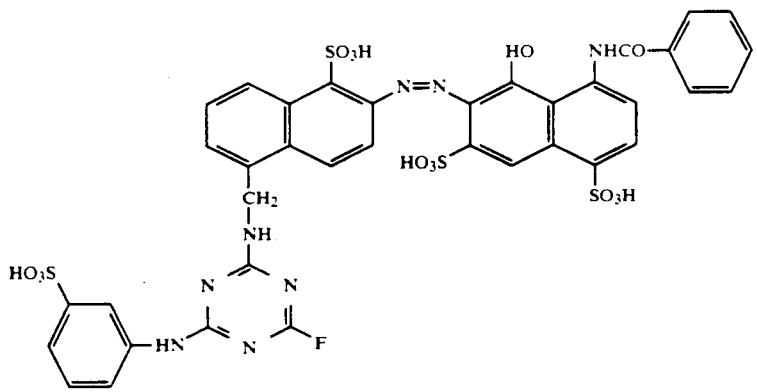

DYEING EXAMPLES

Printing Instructions

If cotton nettle is printed with a printing paste which contains, per kilogram, 20 g of the dyestuff prepared according to Example 1, 100 g of urea, 300 ml of water, 500 g of alginate thickener (60 g of sodium alginate/kg of thickener) and 10 g of sodium carbonate, and which has been made up to 1 kg with water, and the cotton nettle is dried, steamed at 103° C. for 1 minute, rinsed with hot water and soaped at the boil, a clear bluish-tinged red print with good fastness to wet processing and light is obtained.

Padding Instructions 30 parts of the dyestuff prepared according to Example 1 are dissolved in 1,000 parts of water. A cotton fabric is padded with this solution and pressed off to a weight decrease of 90%. The still moist cotton is treated at 70° for 30 minutes in a bath which contains 300 parts of calcined sodium sulphate and 10 parts of calcined sodium carbonate dissolved in 1,000 parts of water. The dyeing is then finished in the customary manner. A brilliant, bluish-tinged red with outstanding fastness to wet processing and light is obtained.

Dyeing Instructions 168 ml of water of 20°–25° are initially introduced into a dyeing beaker of 300 ml capacity, which is in a waterbath which can be heated. 0.3 g of the dyestuff obtained according to Example 1 is mixed thoroughly with 2 ml of cold water to form a paste and 30 ml of hot water (70°) are added; the dyestuff thereby dissolves. The dyestuff solution is added to the initially introduced water and 10 g of cotton yarn are kept continuously in motion in this dye liquor. The temperature of the dye liquor is increased to 40°–50° in the course of 10 minutes, 10 g of anhydrous sodium sulphate are added and dyeing is continued for 30 minutes. 4 g of anhydrous sodium carbonate are then added to the dye liquor and dyeing is carried out at 40°–50° for 60 minutes. The dyed material is then taken out of the dye liquor, the adhering liquor is removed by wringing out or pressing off and the material is rinsed first with cold water and then with hot water until the rinsing liquor is not longer stained. The dyed material is then soaped at the boiling point for 20 minutes in 200 ml of a liquor which contains 0.2 g of a sodium alkyl-sulphate and is rinsed again and dried at 60°-70° in a drying cabinet. A brilliant, bluish-tinged red of outstanding fastness to washing and light is obtained.

Dyestuffs which are similarly valuable and have the colour shades listed in the middle column are obtained if the procedure followed, in the general sense, is according to the statements of this example, but an equivalent amount of one of the amine components mentioned in column 2 is employed instead of m-sulphanilic acid and an equivalent amount of one of the azo components listed in column 1 is employed for the coupling instead of 1-hydroxy-8-benzoylamino-3,5-disulpho-naphthalene.

| Example | Azo component | Amine component | Colour shade |
|---|---|---|---|
| 2 | 1-hydroxy-8-benzoyl-amino-3,5-disulpho-naphthalene | p-sulphanilic acid | bluish-tinged red |
| 3 | 1-hydroxy-8-benzoyl-amino-3,5-disulpho-naphthalene | o-sulphanilic acid | bluish-tinged red |
| 4 | 1-hydroxy-8-benzoyl-amino-3,5-disulpho-naphthalene | 2-amino-toluene-5-sulphonic acid | bluish-tinged red |
| 5 | 1-hydroxy-8-benzoyl-amino-3,5-disulpho-naphthalene | 2-amino-toluene-4-sulphonic acid | bluish-tinged red |
| 6 | 1-hydroxy-8-benzoyl-amino-3,5-disulpho-naphthalene | m-sulphanilic acid | bluish-tinged red |
| 7 | 1-hydroxy-8-benzoyl-amino-3,6-disulpho-naphthalene | m-sulphanilic acid | bluish-tinged red |
| 8 | 1-hydroxy-8-benzoyl-amino-3,6-disulpho-naphthalene | m-sulphanilic acid | bluish-tinged red |
| 9 | 1-hydroxy-8-acetyl-amino-3,5-disulpho-naphthalene | m-sulphanilic acid | bluish-tinged red |
| 10 | 1-hydroxy-8-acetyl-amino-3,6-disulpho-naphthalene | m-sulphanilic acid | bluish-tinged red |
| 11 | 1-hydroxy-3,6-disulpho-naphthalene | m-sulphanilic acid | yellowish-tinged red |
| 12 | 1-hydroxy-4,6-disulpho-naphthalene | m-sulphanilic acid | yellowish-tinged red |
| 13 | 1-hydroxy-4,7-disulpho-naphthalene | m-sulphanilic acid | yellowish-tinged red |
| 14 | 1-hydroxy-3,5-disulpho-naphthalene | m-sulphanilic acid | yellowish-tinged red |
| 15 | 1-hydroxy-4,6-disulpho-naphthalene | m-sulphanilic acid | yellowish-tinged red |
| 16 | 1-hydroxy-4,6-disulpho-naphthalene | 2-chloro-4-sulphoaniline | yellowish-tinged red |
| 17 | 1-hydroxy-4,6-disulpho-naphthalene | 2-chloro-5-sulphoaniline | yellowish-tinged red |
| 18 | 2-hydroxy-3,6-disulpho-naphthalene | 2-chloro-5-sulphoaniline | red |
| 19 | 2-hydroxy-6-sulpho-naphthalene | aniline-2,5-disulphonic acid | scarlet |
| 20 | 2-hydroxy-7-sulpho-naphthalene | aniline-2,5-disulphonic acid | scarlet |
| 21 | 1-carboxymethyl-3-methyl-pyrazol-5-one | o-sulphanilic acid | greenish-tinged yellow |
| 22 | 1-carboxymethyl-3-methyl-pyrazol-5-one | p-sulphanilic acid | greenish-tinged yellow |
| 23 | 1-(β-carboxyethyl)-3-methyl-pyrazol-5-one | m-sulphanilic acid | greenish-tinged yellow |
| 24 | 1-(β-carboxyethyl)-3-methyl-pyrazol-5-one | o-sulphanilic acid | greenish-tinged yellow |
| 25 | 1-(β-carboxyethyl)-3-methyl-pyrazol-5-one | 2-amino-naphthalene-6-sulphonic acid | greenish-tinged yellow |
| 26 | 1-(β-carboxyethyl)-3-methyl-pyrazol-5-one | 2-amino-naphthalene-5-sulphonic acid | greenish-tinged yellow |
| 27 | 1-(β-carboxyethyl)-3-methyl-5-amino-pyrazole | m-sulphanilic acid | greenish-tinged yellow |
| 28 | 1-(4',8'-disulpho-naphth-2-yl)-3-methyl-5-amino-pyrazole | m-sulphanilic acid | yellow |
| 29 | 1-(5',7'-disulpho-naphth-2-yl)-3-methyl-5-amino-pyrazole | m-sulphanilic acid | yellow |
| 30 | 1-(4',8'-disulpho-naphth-2-yl)-3-carboxy-pyrazol-5-one | m-sulphanilic acid | golden yellow |
| 31 | 1-(5',7'-disulpho-naphth-2-yl)-3-carboxy-pyrazol-5-one | m-sulphanilic acid | golden yellow |
| 32 | 1-(5',7'-disulpho-naphth-2-yl)-3-carboxy-pyrazol-5-one | o-sulphanilic acid | golden yellow |
| 33 | 1-hydroxy-3-sulpho-7-(3'-carboxy-phenylamino)-naphthalene | m-sulphanilic acid | brown |
| 34 | 1-hydroxy-3-sulpho-7-(3'-carboxy-phenylamino)-naphthalene | p-sulphanilic acid | brown |
| 35 | 1-hydroxy-3,6-disulpho-7-phenyl-amino-naphthalene | m-sulphanilic acid | brown |
| 36 | 1-(2'-methyl-4'-sulpho-phenyl)-3-methyl-5-amino-pyrazole | m-sulphanilic acid | greenish-tinged yellow |
| 37 | 1-(2'-methyl-4'-sulpho-phenyl)-3-methyl-5-amino-pyrazole | p-sulphanilic acid | greenish-tinged yellow |
| 38 | 1-(2'-methyl-4'-sulpho-phenyl)-3- | o-sulphanilic acid | greenish- |

-continued

| Example | Azo component | Amine component | Colour shade |
|---|---|---|---|
| | methyl-5-amino-pyrazole | | tinged yellow |
| 39 | 1-(2'-chloro-4'-sulpho-phenyl)-3-methyl-pyrazol-5-one | m-sulphanilic acid | greenish-tinged yellow |
| 40 | 1-(2'-chloro-4'-sulpho-phenyl)-3-methyl-pyrazol-5-one | o-toluidine | greenish-tinged yellow |
| 41 | 1-(2'-chloro-4'-sulpho-phenyl)-3-methyl-pyrazol-5-one | o-sulphanilic acid | greenish-tinged yellow |
| 42 | 1-(2'-chloro-4'-sulpho-phenyl)-3-methyl-pyrazol-5-one | 1-amino-2-methoxy-5-sulphobenzene | greenish-tinged yellow |
| 43 | 1-(2'-chloro-4'-sulpho-phenyl)-3-methyl-pyrazol-5-one | 1-amino-4-methoxy-2,5-disulpho-benzene | greenish-tinged yellow |
| 44 | 1-(2',5'-dichloro-4'-sulpho-phenyl)-3-methyl-pyrazol-5-one | m-sulphanilic acid | greenish-tinged yellow |
| 45 | 1-(2'-methyl-4'-sulpho-6'-chloro-phenyl)-3-methyl-pyrazol-5-one | m-sulphanilic acid | greenish-tinged yellow |
| 46 | 1-(2'-methyl-4'-sulpho-phenyl)-3-carboxy-pyrazol-5-one | m-sulphanilic acid | yellow |
| 47 | 1-(2'-methyl-4'-sulpho-phenyl)-3-carboxy-pyrazol-5-one | o-toluidine | yellow |
| 48 | 1-(2'-methyl-4'-sulpho-phenyl)-3-carboxy-pyrazol-5-one | p-sulphanilic acid | yellow |
| 49 | 1-(4'-sulpho-phenyl)-3-carboxy-pyrazol-5-one | p-sulphanilic acid | yellow |
| 50 | 1-(4'-sulpho-phenyl)-3-carboxy-pyrazol-5-one | m-sulphanilic acid | yellow |
| 51 | 1-carboxymethyl-3-methyl-pyrazol-5-one | m-sulphanilic acid | greenish-tinged yellow |
| 52 | 1-(2'-sulphophenyl)-3-methyl-pyrazol-5-one | m-sulphanilic acid | greenish-tinged yellow |
| 53 | 1-(2'-sulphophenyl)-3-methyl-pyrazol-5-one | p-sulphanilic acid | greenish-tinged yellow |
| 54 | 1-(2'-sulphophenyl)-3-methyl-pyrazol-5-one | o-sulphanilic acid | greenish-tinged yellow |
| 55 | 1-(2'-sulphophenyl)-3-methyl-pyrazol-5-one | 2-amino-toluene-5-sulphonic acid | greenish-tinged yellow |
| 56 | 1-(2',5'-disulpho-phenyl)-3-methyl-pyrazol-5-one | m-sulphanilic acid | greenish-tinged yellow |
| 57 | 1-(2',5'-disulpho-phenyl)-3-methyl-pyrazol-5-one | o-sulphanilic acid | greenish-tinged yellow |
| 58 | 1-(2',5'-disulpho-phenyl)-3-methyl-pyrazol-5-one | p-sulphanilic acid | greenish-tinged yellow |
| 59 | 1-(4',8'-disulpho-naphth-2-yl)-3-methyl-pyrazol-5-one | o-sulphanilic acid | greenish-tinged yellow |
| 60 | 1-(4',8'-disulpho-naphth-2-yl)-3-methyl-pyrazol-5-one | o-sulphanilic acid | greenish-tinged yellow |
| 61 | 1-(4',8'-disulpho-naphth-2-yl)-3-methyl-pyrazol-5-one | p-sulphanilic acid | greenish-tinged yellow |
| 62 | 1-(4',8'-disulpho-naphth-2-yl)-3-methyl-pyrazol-5-one | 2-amino-toluene-5-sulphonic acid | greenish-tinged yellow |
| 63 | 1-(5',7'-disulpho-naphth-2-yl)-3-methyl-pyrazol-5-one | m-sulphanilic acid | greenish-tinged yellow |
| 64 | 1-(5',7'-disulpho-naphth-2-yl)-3-methyl-pyrazol-5-one | o-sulphanilic acid | greenish-tinged yellow |
| 65 | 1-(5',7'-disulpho-naphth-2-yl)-3-methyl-pyrazol-5-one | p-sulphanilic acid | greenish-tinged yellow |
| 66 | 1-(5',7'-disulpho-naphth-2-yl)-3-methyl-pyrazol-5-one | 2-amino-toluene-5-sulphonic acid | greenish-tinged yellow |
| 67 | 1-(4',8'-disulpho-naphth-2-yl)-3-methyl-5-amino-pyrazole | 2-amino-naphthalene-6-sulphonic acid | greenish-tinged yellow |
| 68 | 1-(4',8'-disulpho-naphth-2-yl)-3-methyl-5-amino-pyrazole | m-sulphanilic acid | greenish-tinged yellow |

EXAMPLE 69

A neutral solution of 32 g of 1-hydroxy-8-amino-3,6-disulphonaphthalene is added to the diazotisation product prepared from 25.2 g of 2-amino-1-sulpho-5-aminomethyl-naphthalene. In order to accelerate the coupling, the mixture is buffered to pH 2 by adding sodium acetate solution. The acid coupling reaction has then ended after stirring the mixture for several hours. The dyestuff solution is rendered neutral with sodium hydroxide solution. 28 g of sodium bicarbonate and some CaO are added and the diazotisation product obtained from 9.3 g of aniline is then added. The disazo dyestuff is separated out by adding salt. The paste is stirred into 1,000 ml of ice-water, and an aqueous solution of 29.4 g of 2,4-difluoro-6-(3'-sulpho-phenylamino)-triazine, which is obtained according to the statements of Example 1, is added. The pH is kept at pH 8.5 by simultaneously adding 2N sodium hydroxide solution. When the acylation has ended, the dyestuff is salted out, dried and ground. A black dyestuff powder which is readily soluble in water is obtained. In the form of the free acid, the dyestuff corresponds to the composition:

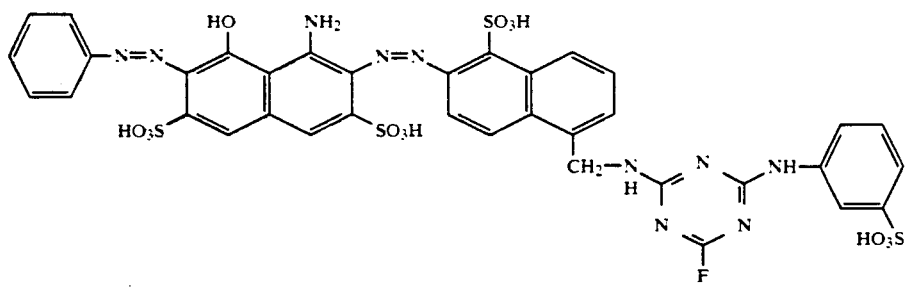

15

Using one of the dyeing process given after Example 1, greenish-tinged blue to black dyeings and prints, depending on the amount of dyestuff employed, of good fastness to wet processing are obtained with this dyestuff on material containing hydroxyl groups.

If the procedure followed is as according to the statements of this example, using the diazo components for the second coupling, azo components and amine components listed in the table, dyestuffs which are similarly valuable and which dye cotton in blue to black shades by one of the processes described are obtained.

| Example | Diazo component for the second coupling | Azo component | Amine component |
|---|---|---|---|
| 70 | m-sulphanilic acid | 1-hydroxy-8-amino-3,6-disulpho-naphthalene | m-sulphanilic acid |
| 71 | p-sulphanilic acid | 1-hydroxy-8-amino-3,6-disulpho-naphthalene | m-sulphanilic acid |
| 72 | o-sulphanilic acid | 1-hydroxy-8-amino-3,6-disulpho-naphthalene | m-sulphanilic acid |
| 73 | 1-amino-2,5-disulpho-benzene | 1-hydroxy-8-amino-3,6-disulpho-naphthalene | m-sulphanilic acid |
| 74 | 1-amino-2,5-disulpho-benzene | 1-hydroxy-8-amino-3,6-disulpho-naphthalene | o-sulphanilic acid |
| 75 | 1-amino-2,5-disulpho-benzene | 1-hydroxy-8-amino-3,6-disulpho-naphthalene | p-sulphanilic acid |
| 76 | 1-amino-2,5-disulpho-benzene | 1-hydroxy-8-amino-3,5-disulpho-naphthalene | p-sulphanilic acid |

COMPARATIVE EXAMPLES

Example 1

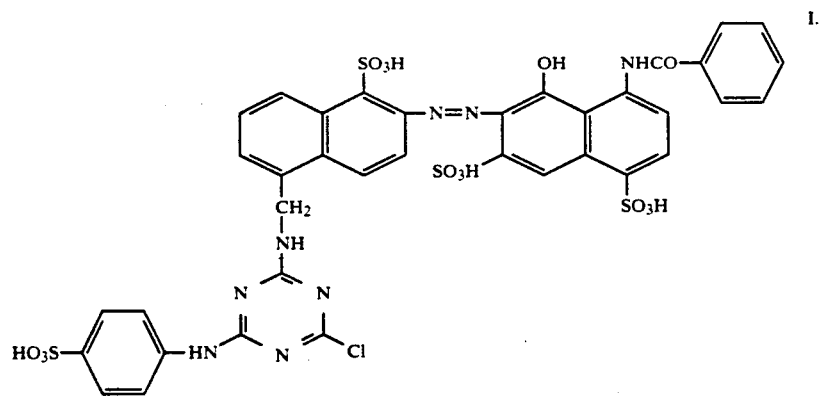

according to U.S. Pat. No. 4,126,609, Example 6.

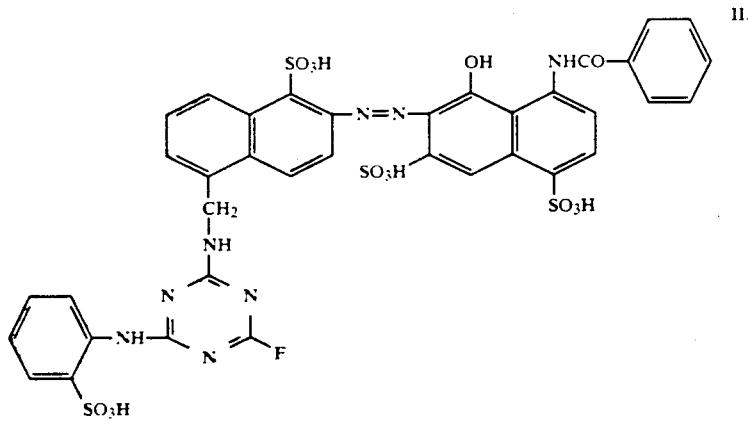

according to the invention.

Fixation properties in the dyeing of cotton from a long bath in the presence of sodium carbonate.

Cotton fabrics were dyed in the usual waay in 1/1 standard depth (dyeing temperatures: dyestuff I: 70° C.; dyestuff II: 40° C.) with dyestuffs I and II respectively.

A determination of the fixation yield i.e. the percentage of reactive dyestuff present in the dyebath chemically fixed on the fibre gave the following values:

I: 34%

II: 53%

Surprisingly the claimed dyestuff gives considerably higher fixation yield in the dying of cotton from a long bath as compared with the prior art dyestuff. Improved fixation properties are of highly technical and economical relevance.

Example 2

I. Dyestuff of the formula

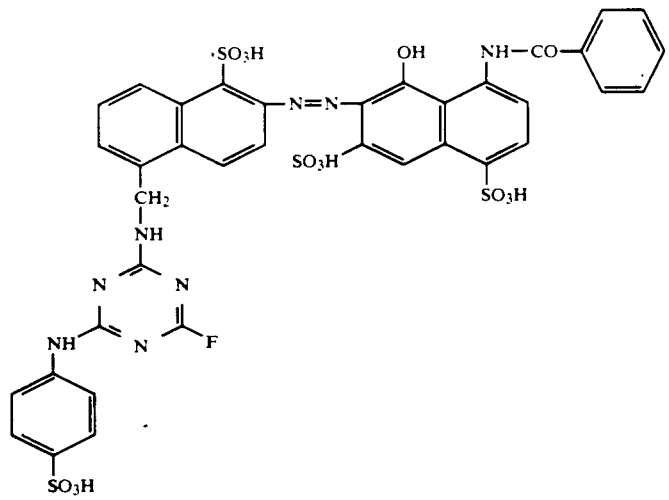

according to the present invention.

II. Dyestuff of the formula

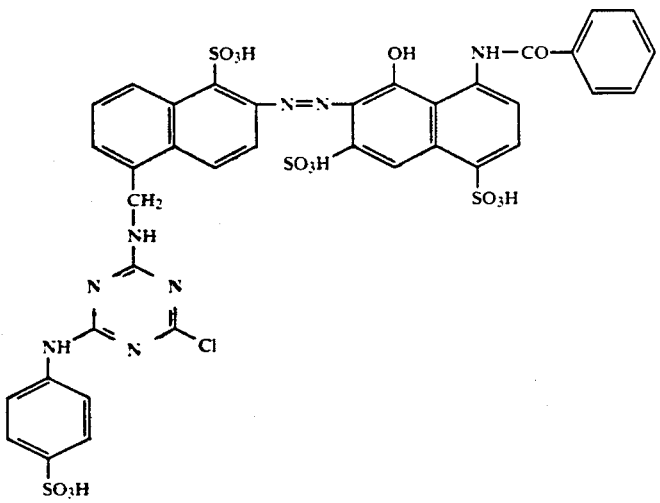

according to U.S. Pat. No. 4,126,609, Example 6.

Cotton fabrics were dyed with dyestuffs I and II. This was done in the usual manner by means of the exhaustion process and by inserting 3 percent by weight of dyestuff I and 3 percent by weight of dyestuff II. The dyeing process was carried out at the following temperatures:

Ia, IIa: 40° C.
Ib, IIb: 50° C.
Ic, IIc: 60° C.
Id, IId: 70° C.
Ie, IIe: 80° C.

Result

With dyestuff I 1/1 Standard depth was already reached at 40° C. whereas the same value of the color depth could be attained with dyestuff II only at 80° C.

The result obtained is indeed surprising because dyestuff II partially decomposes at 80° C., thus rendering a bluish red color tone compared with the red color tint obtained with dyestuff I, which reaches 1/1 standard depth already at 40° C. This degradation is due to a cleavage of the —NH—CO bond of dyestuff II occurring at elevated temperatures.

This fact being an unexpected and unobvious advantage of dyestuff II.

Example 3

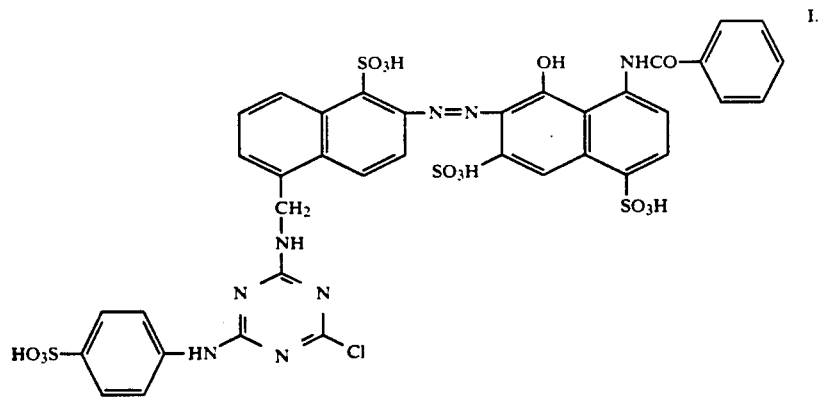

according to U.S. Pat. No. 4,126,609, Example 6.

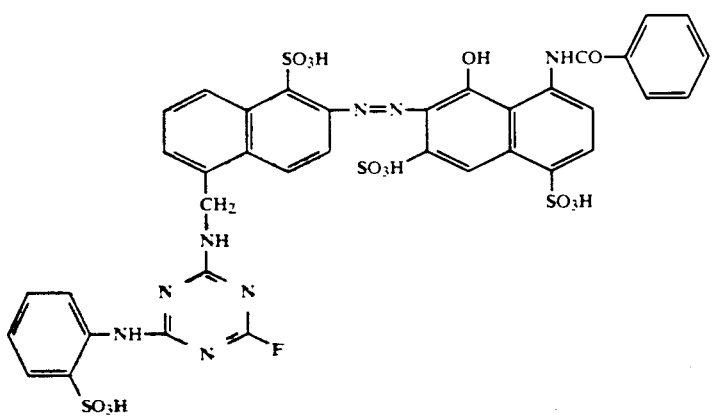

according to the present invention.

Test

Fixation properties in the dyeing of cotton from a long bath in the presence of
a) 20 g/l Na₂CO₃ and 3 ml/l NaOH 36° Be and
b) 5 ml/l NaOH 36° Be (according to the dyeing procedure given in "CIBACRON®" dyes in the exhaustion method" (see encl.))

Cotton fabrics were dyed in the usual way in 1/1 standard depth (dyeing temperatures: dyestuff I: 70° C., dyestuff II: 40° C.) with dyestuffs I and II respectively.

A determination of the fixation yield i.e. the percentage of reactive dyestuff present in the dyebath chemically fixed on the fibre gave the following values:
IIa: 11%; Ib: 8%
IIa: 45%; Ib: 41%

It is evident from this test that even in the presence of "a strong base" as suggested by Ackermann in U.S. Pat. No. 3,627,749, col. 3, line 9, claimed dyestuff gives considerably higher fixation yield in the dyeing of cotton from a long bath as compared with the prior art dyestuff. This test shows that the relative fixation yield is not dependent on the kind of the base used as acid binding agent.

I claim:
1. A dyestuff of the formula

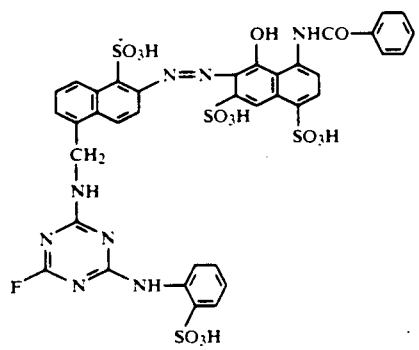

* * * * *